US008542635B2

(12) United States Patent
Han et al.

(10) Patent No.: US 8,542,635 B2
(45) Date of Patent: Sep. 24, 2013

(54) CALIBRATION APPARATUS AND METHOD FOR MULTICELL MULTIPLE INPUT MULTIPLE OUTPUT TRANSMISSION IN MULTIPLE ANTENNA SYSTEM

(75) Inventors: Shuangfeng Han, Suwon-si (KR); Chi-Woo Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 347 days.

(21) Appl. No.: 12/915,814

(22) Filed: Oct. 29, 2010

(65) Prior Publication Data

US 2011/0103271 A1    May 5, 2011

(30) Foreign Application Priority Data

Oct. 30, 2009  (KR) .................. 10-2009-0104165
Dec. 30, 2009  (KR) .................. 10-2009-0133743

(51) Int. Cl.
*H04W 72/04*   (2009.01)
*H04B 7/06*    (2006.01)

(52) U.S. Cl.
USPC ...................... 370/328; 455/452.1

(58) Field of Classification Search
USPC ......... 370/310, 312–314, 328–330, 335–337, 370/341–350, 400, 401, 464, 465, 468; 375/299; 455/452.1
See application file for complete search history.

(56) References Cited

U.S. PATENT DOCUMENTS

| 2006/0056540 | A1* | 3/2006 | Magee ..................... 375/299 |
| 2007/0064823 | A1* | 3/2007 | Hwang et al. ............. 375/260 |
| 2007/0206504 | A1  | 9/2007 | Koo et al. |
| 2007/0281624 | A1  | 12/2007 | Thomas et al. |
| 2009/0046693 | A1  | 2/2009 | Nory et al. |
| 2009/0190520 | A1* | 7/2009 | Hochwald et al. .......... 370/315 |
| 2009/0190687 | A1  | 7/2009 | Moon et al. |
| 2009/0245214 | A1* | 10/2009 | Mudulodu et al. .......... 370/338 |
| 2009/0303918 | A1* | 12/2009 | Ma et al. ................... 370/315 |
| 2011/0098054 | A1* | 4/2011 | Gorokhov et al. ......... 455/452.1 |

* cited by examiner

*Primary Examiner* — Kerri Rose
(74) *Attorney, Agent, or Firm* — Jefferson IP Law, LLP

(57) ABSTRACT

A calibration apparatus and a calibration method for multicell Multiple Input Multiple Output (MIMO) transmission in a multiple antenna system are provided. More particularly, an operating method of a Mobile Station (MS) for performing calibration for multicell MIMO transmission in a multiple antenna system includes negotiating a multi-Base Station (BS) joint processing with a BS, receiving a control message including information instructing multi-BS calibration for sounding based on the multi-BS joint processing, from the BS; when receiving the control message involving the multi-BS joint processing, generating a second sounding sequence by mapping estimated phases of downlink channels per subcarrier of BSs to a first sounding sequence allocated from the BS, and transmitting the second sounding sequence, including the phases of the downlink channels per subcarrier, over a sounding symbol interval with respect to each of the BSs involving the multi-BS joint processing. Hence, feedback overhead in the calibration of the multicell MIMO transmission can be reduced.

20 Claims, 5 Drawing Sheets

CALIBRATION APPARATUS AND METHOD FOR MULTICELL MULTIPLE INPUT MULTIPLE OUTPUT TRANSMISSION IN MULTIPLE ANTENNA SYSTEM

PRIORITY

This application claims the benefit under 35 U.S.C. §119 (a) of a Korean patent application filed on Oct. 30, 2009 in the Korean Intellectual Property Office, and assigned Serial No. 10-2009-0104165, and a Korean patent application filed on Dec. 30, 2009 in the Korean Intellectual Property Office, and assigned Serial No. 10-2009-0133743, the entire disclosures of each of which are hereby incorporated by reference.

BACKGROUND OF THE INVENTION

1. Field of the Invention

The present invention relates to calibration in a wireless communication system. More particularly, the present invention relates to a calibration apparatus and a calibration method for multicell Multiple Input Multiple Output (MIMO) transmission in a multiple antenna system.

2. Description of the Related Art

In a cellular wireless communication system, constant efforts are exerted to mitigate inter-cell interference. Recently, a method for reducing the interference more actively through cooperation between base stations is underway. In particular, cooperative Multiple Input Multiple Output (MIMO) schemes that extend various MIMO schemes, applied to a single cell, to a plurality of base stations are suggested. To use the cooperative MIMO scheme, the base stations require channel information of each mobile station. At this time, feedback of the necessary channel information is mostly in proportion to a performance of the cooperative MIMO scheme. To maximize the performance of the cooperative MIMO scheme, a considerable Channel State Information (CSI) needs to be fed back.

In a Time Division Duplex (TDD) system, the base stations may obtain the channel information using a sounding training signal without large-capacity data feedback. In addition, it is possible to greatly reduce overhead when using the sounding training signal with the cooperative MIMO scheme, as a plurality of the base stations may simultaneously obtain the channel information using the sounding training signal transmitted from the mobile station. Moreover, the use of the sounding by the base stations needs to be preceded by calibration, which synchronizes transmit and receive Radio Frequency (RF) chains between each individual base station and the mobile station.

The calibration process, by which reciprocity between an uplink channel and a downlink channel is obtained, compensates for amplitude and phase shifts of signals generating in the transmit RF chain and the receive RF chain of a transmitter and a receiver. Hence, the prior calibration is essential when the sounding is applied and various schemes are suggested for performing this process. However, conventional calibration methods target the transmitter and the receiver within the single cell and do not take account of the sounding for the cooperative MIMO scheme. As a result, even when the calibration is conducted per cell according to the conventional calibration method, calibration complex constants of the base stations involving the cooperative MIMO are different from each other and thus, the performance of the cooperative MIMO is degraded.

Therefore, a need exists for a calibration apparatus and a calibration method for multicell MIMO transmission based on uplink sounding in a multiple antenna system

SUMMARY OF THE INVENTION

An aspect of the present invention is to address at least the above-mentioned problems and/or disadvantages and to provide at least the advantages described below. Accordingly, an aspect of the present invention is to provide a calibration apparatus and a calibration method for multicell Multiple Input Multiple Output (MIMO) transmission in a multiple antenna system.

Another aspect of the present invention is to provide a calibration apparatus and a calibration method for multicell MIMO transmission based on uplink sounding in a multiple antenna system.

A further aspect of the present invention is to provide an apparatus and a method for reducing calibration feedback overhead based on multicell in a multiple antenna system.

In accordance with an aspect of the present invention, an operating method of a Mobile Station (MS) for performing calibration for multicell MIMO transmission in a multiple antenna system is provided. The method includes negotiating a multi-Base Station (BS) joint processing with a BS, receiving a control message including information instructing multi-BS calibration for sounding based on the multi-BS joint processing, from the BS, when receiving the control message involving the multi-BS joint processing, generating a second sounding sequence by mapping estimated phases of downlink channels per subcarrier of BSs to a first sounding sequence allocated from the BS, and transmitting the second sounding sequence, including the phases of the downlink channels per subcarrier, over a sounding symbol interval with respect to each of the BSs involving the multi-BS joint processing.

In accordance with another aspect of the present invention, an operating method of a BS for performing calibration for multicell MIMO transmission in a multiple antenna system is provided. The method includes negotiating a multi-BS joint processing with an MS, transmitting a control message including information instructing multi-BS calibration for sounding based on the multi-BS joint processing, to the MS, after transmitting the control message, receiving a sounding sequence including a phase of a downlink channel per subcarrier of the MS over a corresponding sounding symbol interval, and compensating for mismatch between the phase of the downlink channel and a phase of an uplink channel from the received sounding sequence.

In accordance with yet another aspect of the present invention, an apparatus of an MS for performing calibration for multicell MIMO transmission in a multiple antenna system is provided. The apparatus includes a controller for negotiating a multi-BS joint processing with a BS, a receiver for receiving a control message including information instructing multi-BS calibration for sounding based on the multi-BS joint processing, from the BS, a sounding mapper for, when the control message is received, generating a second sounding sequence by mapping estimated phases of downlink channels per subcarrier of BSs involving the multi-BS joint processing, to a first sounding sequence allocated from the BS, and a transmitter for transmitting the second sounding sequence including the phases of the downlink channels per subcarrier over a sounding symbol interval with respect to each of the BSs involving the multi-BS joint processing.

In accordance with still another aspect of the present invention, an apparatus of a BS for performing calibration for multicell MIMO transmission in a multiple antenna system is provided. The apparatus includes a controller for negotiating a multi-BS joint processing with an MS, a transmitter for transmitting a control message including information instructing multi-BS calibration for sounding based on the multi-BS joint processing, to the MS, a receiver for, after the control message is sent, receiving a sounding sequence including a phase of a downlink channel per subcarrier of the MS over a corresponding sounding symbol interval, and a phase shift compensator for compensating for mismatch between the phase of the downlink channel and a phase of an uplink channel from the received sounding sequence.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

Figure 1:
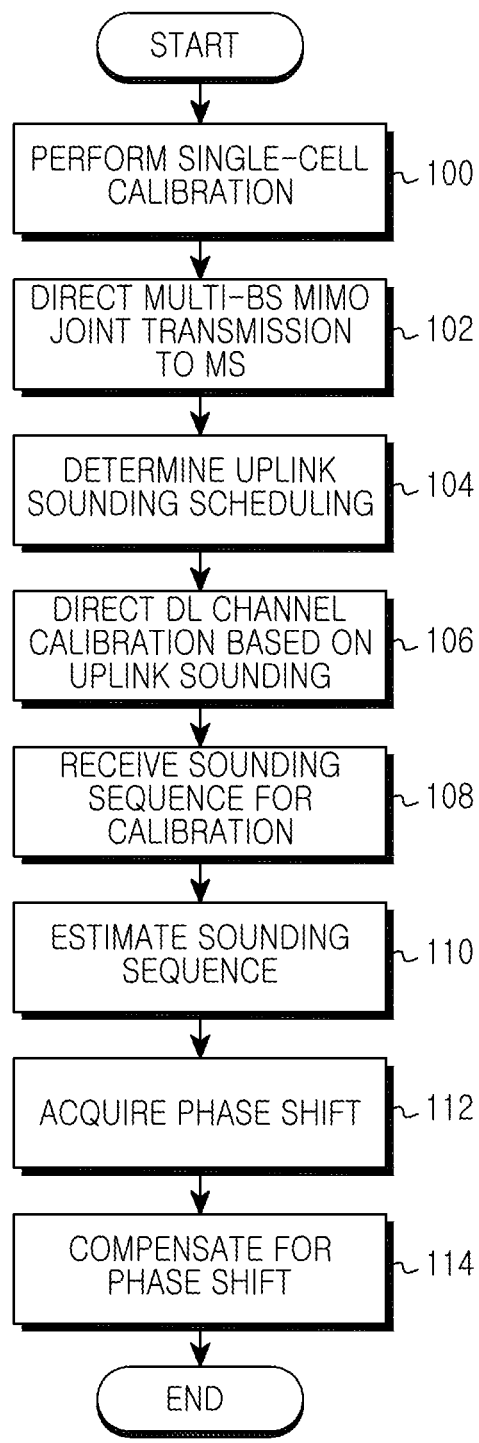
FIG. 1 is a flowchart of Base Station (BS) operations for calibration for multicell Multiple Input Multiple Output (MIMO) transmission in a multiple antenna system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide a calibration apparatus and a calibration method for multicell Multiple Input Multiple Output (MIMO) transmission in a multiple antenna system.

Hereinafter, Orthogonal Frequency Division Multiplexing (OFDM)/Orthogonal Frequency Division Multiple Access (OFDMA) wireless communication system is exemplified, and the present invention is equally applicable to other wireless communication system. In the OFDM wireless communication system, it is apparent that calibration needs to be conducted per band because signal characteristics depend on frequency bands. Moreover, to ease the understanding, the calibration technique is explained by considering only a single frequency band.

FIGS. 1 through 5, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly state otherwise. A set is defined as a non-empty set including at least one element.

FIG. 1 is a flowchart of Base Station (BS) operations for calibration for multicell MIMO transmission in a multiple antenna system according to an exemplary embodiment of the present invention.

Referring to FIG. 1, the BS performs the single-cell calibration using a ratio of a downlink channel and an uplink channel according to a predefined procedure in step 100. That is, the calibration compensates for analog gain mismatch among antennas by multiplying a phase and an amplitude by each antenna.

In step 102, the BS informs the corresponding Mobile Station (MS) of multi-BS MIMO joint transmission using a Feedback_Polling_IE message. The multi-BS MIMO joint transmission includes a Closed Loop (CL)-Macro Diversity (MD), Collaborative (Co)-MIMO, and the like.

The BS allocates uplink sounding to a plurality of MSs using an UpLink (UL) sounding command A-MAP IE message in step 104. Herein, it is assumed that the sounding sequence $S_q=(S_{q,1}, S_{q,2}, \ldots, S_{q,L})$ is allocated. L denotes a subcarrier index in the frequency domain. That is, $S_{q,k}$ denotes the sounding sequence carried by the k-th subcarrier of a sounding symbol.

In step 106, the BS directs downlink channel calibration based on the uplink sounding using the UL sounding command A-MAP IE message. For doing so, a DownLink (DL)/UL channel calibration field is added to the conventional UL sounding command A-MAP IE message. The DL/UL channel calibration field '1' instructs the downlink channel calibration based on the uplink, and the DL/UL channel calibration field '0' instructs no downlink channel calibration based on the uplink.

When setting the DL/UL channel calibration field value to '1', the BS receives a sounding sequence for the calibration from the corresponding MS in step 108. The sounding sequence for the calibration is a sequence produced by mapping downlink channel phase shifts $\theta_{k,sub}^{DL}$ of the multiple BSs of the cooperative communication to the sounding sequence. The mapping information between $S_q$ and the downlink channel phase shift $\theta_k^{DL}$ of the multiple BSs of the cooperative communication may be provided from the corresponding MS in advance, or to the BS through a separate negotiation process. Alternatively, as for the mapping information known to the BS and the MS, a separate control message or negotiation is unnecessary.

In step 110, the BS estimates the received sounding sequence using correlation of a sounding channel. Herein, the received sounding sequence is given by Equation 1.

$$S_q^k = a_k e^{j\theta_{k,sub}^{UL}} S_q^{new} \quad (1)$$

In Equation 1, $\theta_{k,sub}^{UL}$ denotes the uplink phase shift per subcarrier at the BS k, $a_k$ denotes a sounding sequence size, and $S_q^{new}$ denotes the sounding sequence for the calibration sent from the MS.

In step 112, the BS acquires a per subcarrier phase shift $\theta_{k,sub}^{UL} - \theta_{k,sub}^{DL}$ by comparing the estimated sounding sequence $S_q^k$ with the original sounding sequence $S_q$.

In step 114, the BS compensates for mismatch between the phase of the downlink channel and the phase of the uplink channel and transmits data using the acquired phase shift.

$$d_k^{tx} = e^{j(\theta_{k,sub}^{DL} - \theta_{k,sub}^{UL})} d_k \quad (2)$$

In Equation 2, $\theta_{k,sub}^{UL}$ denotes the uplink phase shift per subcarrier at the BS k, $\theta_{k,sub}^{DL}$ denotes the downlink phase shift per subcarrier at the BS k, and $d_k$ denotes the transmit data.

Figure 2:
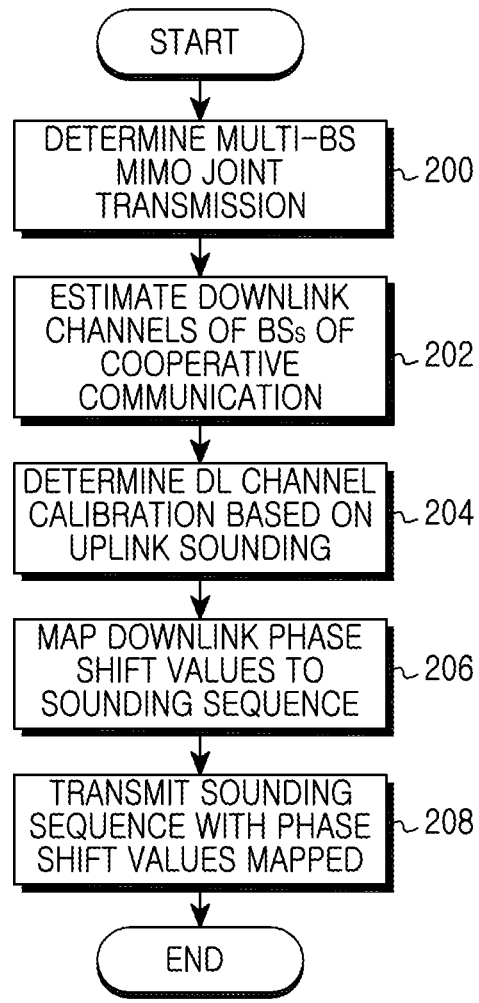
FIG. 2 is a flowchart of Mobile Station (MS) operations for the calibration for the multicell MIMO transmission in the multiple antenna system according to an exemplary embodiment of the present invention.

FIG. 2 is a flowchart of the MS operations for the calibration for the multicell MIMO transmission in the multiple antenna system according to an exemplary embodiment of the present invention.

In step 200, the MS receives the Feedback_Polling_IE message including the multi-BS MIMO joint transmission instruction information and determines the multi-BS MIMO joint transmission.

In step 202, the MS estimates downlink channels of the N-ary BSs of the cooperative communication by receiving a preamble or a midamble signal.

That is, the MS involving the multi-BS MIMO estimates every downlink reference channel $h_{i,j}^{k,sub}$ corresponding to the multiple cooperative BSs. The downlink reference channel $h_{i,j}^{k,sub}$ denotes the per subcarrier channels between the i-th transmit antenna of the k-th BS and the j-th transmit antenna of the MS, where k=1, ..., N denotes the BS index in the cooperative communication and N denotes the number of the BSs in the cooperative communication.

Herein, the downlink channel is expressed as $h_{i,j}^{k,sub} = \alpha e^{j\theta_{k,sub}^{DL}}$, and the MS estimates the per subcarrier phase $\theta_{k,sub}^{DL}$ of $h_{i,j}^{k,sub}$. Herein, k=1, ..., N and $\alpha$ denote the amplitude.

In step 204, the MS determines whether to perform the downlink channel calibration based on the uplink sounding, using the UL sounding command A-MAP IE message including the downlink channel calibration instruction information based on the uplink sounding.

In step 206, the MS maps the sounding sequence (hereafter, referred to as a first sounding sequence) allocated through the UL sounding command A-MAP IE message, and the downlink channel phase shift values of the BSs of the cooperative communication.

The sounding sequence (hereafter, referred to as a second sounding sequence) mapped to the phase shift values of the downlink channels is given by Equation 3.

$$S_q^{new} = (S_{q,1}, e^{-j\theta_{1,sub}^{DL}} S_{q,i}, \ldots, e^{-j\theta_{k,sub}^{DL}} S_{q,i}, \ldots, e^{-j\theta_{N,sub}^{DL}} S_{q,k}, S_{q,L}) \quad (3)$$

In Equation 3, $S_q = (S_{q,1}, S_{q,2}, \ldots, S_{q,L})$ denotes the original sounding sequence, L denotes a sounding sequence length, k denotes the BS index, and N denotes the number of the BSs in the cooperative communication. The number N of the BSs in the cooperative communication is assumed to be always smaller than the number L of the subcarriers of the sounding symbol. That is, $\theta_{k,sub}^{DL}$ (k=1, ..., N) is randomly mapped to one sounding sequence within one sounding frame. For example, $\theta_{1,1}^{DL}$ for the first subcarrier of the first BS is mapped to $S_{q,1}, \theta_{2,k}^{DL}$ for the k-th subcarrier of the second BS is mapped to $S_{q,k}$, and $\theta_{N,i}^{DL}$ for the i-th subcarrier of the N-th BS is mapped to $S_{q,i}$. In the next sounding frame, $\theta_{1,i}^{DL}$ for the i-th subcarrier of the first BS is mapped to $S_{q,i}, \theta_{2,1}^{DL}$ for the first subcarrier of the second BS is mapped to $S_{q,1}$, and $\theta_{N,k}^{DL}$ for the k-th subcarrier of the N-th BS is mapped to $S_{q,k}$. Hence, when the sounding frames as many as the BSs of the cooperative communication are transmitted, the MS can transmit $\theta_{k,sub}^{DL}$ per subcarrier with respect to each BS of the cooperative communication.

In the above exemplary implementation, the first sounding sequence $S_q = (S_{q,1}, S_{q,2}, \ldots, S_{q,L})$ and the downlink channel phase shift values $e^{-j\theta_{1,sub}^{DL}}, \ldots, e^{-j\theta_{N,sub}^{DL}}$ of the BSs of the cooperative communication can be mapped at random. Herein, a serving BS needs to notify the MS of the mapping using a downlink control message. In addition, the serving BS needs to notify the other BSs of the cooperative communication of the mapping information.

In another exemplary implementation, the first sounding sequence $S_q = (S_{q,1}, S_{q,2}, \ldots, S_{q,L})$ and the downlink channel phase shift values $e^{-j\theta_{1,sub}^{DL}}, \ldots, e^{-j\theta_{N,sub}^{DL}}$ of the BSs of the cooperative communication can be mapped based on Equation 4. Similarly, the mapping information should be notified to the other BSs and the corresponding MS. Alternatively, when the MS and the other BSs are aware of a predefined mapping rule in advance, the MS does not need to notify the other cooperative communication BSs.

$$S_{q,1}, S_{q,1+Integer(L/N)}, \ldots, S_{q,1+N*Integer(L/N)} \quad (4)$$

In Equation 4, the multiple of Integer(L/N) determines the mapping wherein N denotes the number of the BSs in the cooperative communication and L denotes the sounding sequence length.

In step 208, the MS transmits the sounding sequence with the mapped phase shift values of the downlink channels of the BSs of the cooperative communication.

Figure 3:
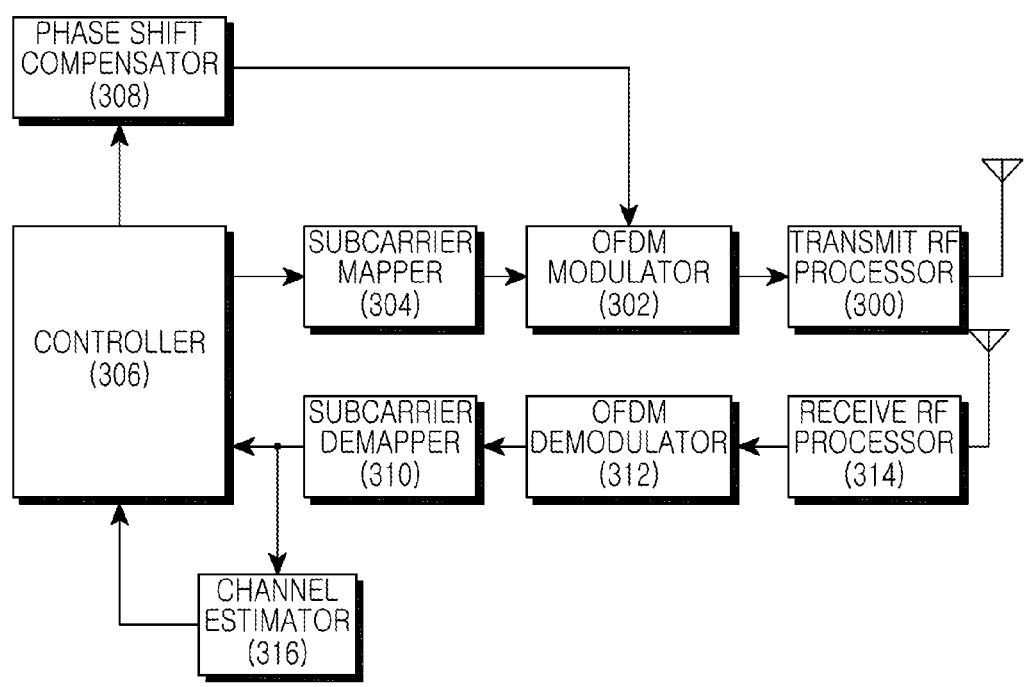
FIG. 3 is a block diagram of the BS for the calibration for the multicell MIMO transmission in the multiple antenna system according to an exemplary embodiment of the present invention.

FIG. 3 is a block diagram of the BS for the calibration for the multicell MIMO transmission in the multiple antenna system according to an exemplary embodiment of the present invention.

Referring to FIG. 3, the BS includes a transmit RF processor 300, an OFDM modulator 302, a subcarrier mapper 304, a controller 306, a phase shift compensator 308, a subcarrier demapper 310, an OFDM demodulator 312, a receive RF processor 314, and a channel estimator 316.

The subcarrier mapper 304 maps the data symbols and the control symbols fed from the controller 306 to the frequency resource per antenna. The OFDM modulator 302 converts the symbols mapped to the frequency resource output from the subcarrier mapper 304 to a time-domain signal, through an Inverse Fast Fourier Transform (IFFT) process, and constitutes OFDM symbols by inserting a Cyclic Prefix (CP). The transmit RF processor 300 converts the OFDM symbols output from the OFDM modulator 302 to an analog signal, up-converts and amplifies to an RF signal, and transmits the RF signal over a plurality of antennas. More particularly, the transmit RF processor 300 calibrates the transmit signal using a calibration parameter provided from the phase shift compensator 308. That is, the transmit RF processor 300 transmits the signal by multiplying the transmit signal stream by the calibration parameter.

The receive RF processor 314 amplifies and down-converts RF signals received via the antennas to baseband signals, converts them to digital signals, and outputs the digital signals to the OFDM demodulator 312. The OFDM demodulator 312 divides the signals output from the receive RF processor 314 to the OFDM symbols, and restores the symbols mapped to the frequency resource by removing the CP and applying an FFT process. The subcarrier demapper 310 extracts the symbols mapped to the frequency resource output from the OFDM demodulator 312 and outputs the extracted symbols on the processing unit basis. For example, the subcarrier demapper 310 provides the data symbols and the control symbols to the controller 306, and provides the sounding symbols to the channel estimator 316. The channel estimator 316 estimates the uplink channel using the sounding symbols.

The controller 306 encodes and modulates traffic and control information to complex symbols, and provides the complex symbols to the subcarrier mapper 304. The controller 306 generates pilot symbols (or preambles) for estimating the downlink channels of the MSs, and outputs the pilot symbols to the subcarrier mapper 304. By demodulating and decoding the data symbols fed from the subcarrier demapper 310, the controller 306 restores the traffic and the control information. The channel estimator 316 estimates the uplink channel matrix using the sounding symbols provided from the subcarrier demapper 310, and outputs the estimated uplink channel coefficient or matrix to the controller 306.

The controller 306 carries out the multi-BS MIMO joint transmission. For example, the controller 306 directs the multi-BS MIMO joint transmission to the MS using the Feedback_Polling_IE message. To ensure the reciprocity between the uplink channel and the downlink channel, the controller 306 performs the calibration. More particularly, the controller 306 controls the multicell calibration for the cooperative MIMO scheme.

Herein, the multicell calibration is elucidated. The controller 306 allocates the uplink sounding to allocate to the MSs using the UL sounding command A-MAP IE message, and directs the downlink channel calibration based on the uplink sounding.

Thereafter, when the second sounding sequence for the calibration is received from the corresponding MS, the controller 306 detects the second sounding sequence.

The phase shift compensator 308 obtains the phase shift $\theta_{k,sub}^{UL} - \theta_{k,sub}^{DL}$ by comparing the second sounding sequence $S_{q,k}$ detected by the controller 306 with the first original sounding sequence $S_q$. When the transmit RF processor 300 transmits the RF signal, the phase shift compensator 308 processes the received signal to obtain the phase shift $\theta_{k,sub}^{UL} - \theta_{k,sub}^{DL}$ and compensates for mismatch between the phase of the downlink channel and ksrfb sr the phase of the uplink channel.

The second sounding sequence for the calibration is the sequence produced by mapping the downlink channel phase shifts $\theta_{k,sub}^{DL}$ of the BSs of the cooperative communication to the first sounding sequence. The mapping information between $S_q$ and the downlink channel phase shifts $\theta_{k,sub}^{DL}$ of the BSs of the cooperative communication can be received from the corresponding MS in advance, or provided to the MS through a separate negotiation. Alternatively, as for the mapping information already known to the BS and the MS, a separate control message or negotiation is unnecessary.

Figure 4:
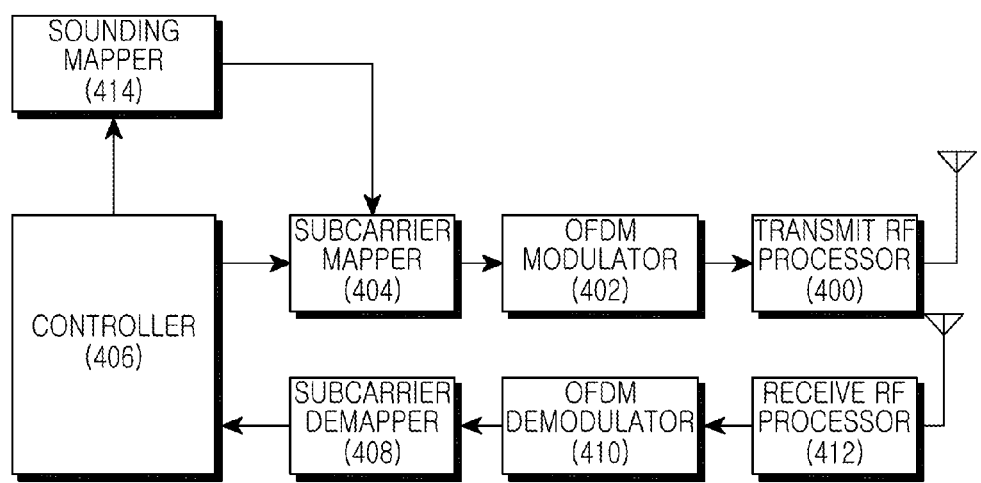
FIG. 4 is a block diagram of the MS for the calibration for the multicell MIMO transmission in the multiple antenna system according to an exemplary embodiment of the present invention.

FIG. 4 is a block diagram of the MS for the calibration for the multicell MIMO transmission in the multiple antenna system according to an exemplary embodiment of the present invention.

Referring to FIG. 4, the MS includes a plurality of receive RF processors 412, an OFDM demodulator 410, a subcarrier demapper 408, a subcarrier mapper 404, an OFDM modulator 402, a transmit RF processor 400, a controller 406, and a sounding mapper 414.

The receive RF processor 412 amplifies and down-converts RF signals received via antennas to baseband signals, converts them to digital signals, and outputs the digital signals to the OFDM demodulator 410. The OFDM demodulator 410 divides the signals output from the receive RF processor 412 to the OFDM symbols, and restores the symbols mapped to the frequency resource by removing the CP and applying the FFT process. The subcarrier demapper 408 extracts the symbols mapped to the frequency resource output from the OFDM demodulator 410, and outputs the extracted symbols on the processing unit basis. For example, the subcarrier demapper 408 provides data symbols to the controller 406, and provides pilot symbols to the sounding mapper 414.

The subcarrier mapper 404 maps the data symbols and the pilot symbols fed from the controller 406 to the frequency resource per antenna. The OFDM modulator 402 converts the symbols mapped to the frequency resource output from the subcarrier mapper 404 to a time-domain signal through the IFFT process, and constitutes OFDM symbols by inserting the CP. The transmit RF processor 400 converts the OFDM symbols output from the OFDM modulator 402 to an analog signal, up-converts and amplifies the analog signal to an RF signal, and transmits the RF signal over a plurality of antennas.

The controller 406 restores traffic and control information by demodulating and decoding the data symbols output from the subcarrier demapper 408. The controller 406 estimates the uplink channel matrix of the BS using the pilot symbols output from the subcarrier demapper 408.

The controller 406 encodes and demodulates the traffic and the control information to complex symbols, and provides the complex symbols to the subcarrier mappers 404.

The controller 406 performs the calibration to ensure the reciprocity between the uplink channel and the downlink channel. In particular, the controller 406 controls the multicell calibration for the cooperative MIMO scheme. Herein, the multicell calibration is described in more detail. By receiving the Feedback_Polling_IE message, including the multi-BS MIMO joint transmission instruction information, the controller 406 determines the multi-BS MIMO joint transmission. Using the UL sounding command A-MAP IE message including the downlink channel calibration instruction information based on the uplink sounding, the controller 406 determines whether to perform the downlink channel calibration based on the uplink sounding.

Thereafter, the controller 414 estimates the downlink channels of the N-ary BSs of the cooperative communication and provides the estimation result to the sounding mapper 414.

The sounding mapper 414 maps the first sounding sequence allocated through the UL sounding command A-MAP IE message and the downlink channel phase shift values of the BSs of the cooperative communication.

The first sounding sequence $S_q = (S_{q,1}, S_{q,2}, \ldots, S_{q,L})$ and the downlink channel phase shift values $e^{-j\theta_{1,sub}^{DL}}, \ldots, e^{-j\theta_{N,sub}^{DL}}$ of the BSs of the cooperative communication can be mapped at random. Herein, the serving BS needs to notify the MS of the mapping using a downlink control message. The serving BS needs to notify the other BSs of the cooperative communication of the mapping information.

Alternatively, the first sounding sequence $S_q = (S_{q,1}, S_{q,2}, \ldots, S_{q,L})$ and the downlink channel phase shift values $e^{-j\theta_{1,sub}^{DL}}, \ldots, e^{-j\theta_{N,sub}^{DL}}$ of the BSs of the cooperative communication can be mapped based on Equation 4. Similarly, the mapping information should be notified to the other BSs and the corresponding MS. Alternatively, when the MS and the other BSs are aware of the predefined mapping rule in advance, the MS does not need to notify the other cooperative communication BSs.

In another alternative, to map the phase values of the downlink channels to the sounding sequence, the sounding mapper 414 maps per subcarrier $\theta_{N,k}^{DL}$ to the sounding sequence in the corresponding sounding frame per cooperative communication BS.

Figure 5:
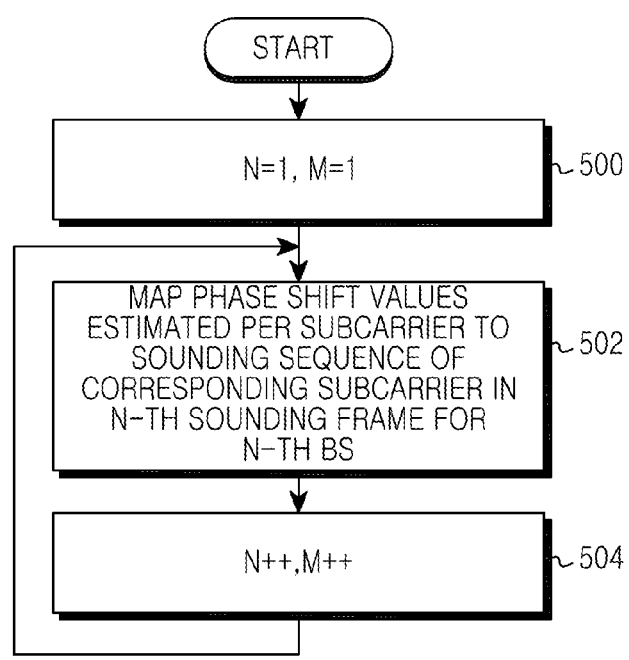
FIG. 5 is a flowchart of a method for mapping phase shift values of downlink channels to a sounding sequence according to an exemplary embodiment of the present invention.

FIG. 5 is a flowchart of a method for mapping the phase shift values of the downlink channel to the sounding sequence according to an exemplary embodiment of the present invention.

Referring to FIG. 5, the MS estimates the downlink channels of the BSs of the cooperative communication and then maps the phase values of the downlink channel to the sounding sequence.

In step 500, the MS sets N=1. Herein, N denotes the number of the BSs involving the cooperative communication.

In step 502, the MS maps the phase shift values estimated per subcarrier in the N-th sounding frame for the N-th BS, to the sounding sequence per subcarrier. For example, $\theta_{N,1}^{DL}$ for the first subcarrier of the N-th BS is mapped to the sounding sequence $S_{q,1}$ carried by the first subcarrier, $\theta_{N,k}^{DL}$ for the k-th subcarrier of the N-th BS is mapped to the sounding sequence $S_{q,k}$ carried by the k-th subcarrier, and $\theta_{N,L}^{DL}$ for the L-th subcarrier of the N-th BS is mapped to sounding sequence $S_{q,L}$ carried by the k-th subcarrier.

Thereafter, the MS increases N and M by one in step 504 and repeats the step 502.

More specifically, to map the phase values for the downlink channels to the sounding sequence, the MS maps the per subcarrier $\theta_{N,k}^{DL}$ to the sounding sequence in the corresponding sounding frame per cooperative communication BS. Thus, to transmit the phase shift value to the BS of the cooperative communication through the sounding sequence, N-ary sounding frames are necessary. The N-ary sounding frame intervals are referred to as sounding intervals based on the calibration. The BS can instruct the sounding interval based on the calibration to the MS using the control message, or predefine the sounding interval based on the calibration.

As set forth above, as the MS maps the downlink phase shift values of the BSs involving the cooperative communication to the allocated sounding sequence in the multiple antenna system, the feedback overhead for the phase comparison can be reduced. In addition, during the BS joint transmission with the independent calibration, the MS can maximize Signal-to-Interference-plus-Noise-Ratio (SINR).

While the present has been shown and described with reference to certain exemplary embodiment thereof, it will be understood by those skilled in the art that various changes in form and details may be made therein without departing from the spirit and scope of the invention as defined by the appended claims and their equivalents.

What is claimed is:

1. An operating method of a Mobile Station (MS) for performing calibration for multicell Multiple Input Multiple Output (MIMO) transmission in a multiple antenna system, the method comprising:
    negotiating a multi-Base Station (BS) joint processing with a BS;
    receiving a control message comprising information instructing multi BS calibration for sounding based on the multi BS joint processing, from the BS;
    when receiving the control message involving the multi-BS joint processing, generating a second sounding sequence by mapping estimated phases of downlink channels per subcarrier of BSs to a first sounding sequence allocated from the BS; and
    transmitting the second sounding sequence, comprising the phases of the downlink channels per subcarrier, over a sounding symbol interval with respect to each of the BSs involving the multi-BS joint processing.

2. The method of claim 1, wherein the generating of the second sounding sequence comprises:
    receiving allocation resource for the first sounding sequence;
    measuring the phases of the downlink channels per subcarrier with respect to the estimated BSs involving the multi-BS joint processing; and
    mapping the phases of the downlink channels to the first sounding sequence.

3. The method of claim 1, wherein the transmitting of the second sounding sequence transmits a sounding sequence comprising the phase of the downlink channel per subcarrier of a corresponding BS over a corresponding sounding interval.

4. The method of claim 3, wherein the corresponding sounding interval is a predefined calibration interval based on the sounding sequence between the BS and the MS.

5. The method of claim 1, wherein a whole sounding interval for delivering the second sounding sequence is determined by considering the number of the BSs involving the multi-BS joint processing.

6. The method of claim 1, wherein the multicell MIMO transmission is at least one of a Closed Loop Macro Diversity (CL-MD) and a Collaborative MIMO (Co-MIMO).

7. The method of claim 1, wherein the multiple antenna system comprises Time Division Duplex (TDD) system based on Orthogonal Frequency Division Multiplexing (OFDM)/Orthogonal Frequency Division Multiple Access (OFDMA).

8. An operating method of a Base Station (BS) for performing calibration for multicell Multiple Input Multiple Output (MIMO) transmission in a multiple antenna system, the method comprising:
    negotiating a multi-BS joint processing with a Mobile Station (MS);
    transmitting a control message comprising information instructing multi BS calibration for sounding based on the multi-BS joint processing, to the MS;
    after transmitting the control message, receiving a sounding sequence comprising a phase of a downlink channel per subcarrier of the MS over a corresponding sounding symbol interval; and compensating for mismatch between the phase of the downlink channel and a phase of an uplink channel from the received sounding sequence.

9. The method of claim 8, wherein the multicell MIMO transmission is at least one of a Closed Loop Macro Diversity (CL-MD) and a Collaborative MIMO (Co-MIMO).

10. The method of claim 8, wherein the multiple antenna system comprises Time Division Duplex (TDD) system based on Orthogonal Frequency Division Multiplexing (OFDM)/Orthogonal Frequency Division Multiple Access (OFDMA).

11. An apparatus of a Mobile Station (MS) for performing calibration for multicell Multiple Input Multiple Output (MIMO) transmission in a multiple antenna system, the apparatus comprising:
- a controller for negotiating a multi-Base Station (BS) joint processing with a BS;
- a receiver for receiving a control message comprising information instructing multi BS calibration for sounding based on the multi BS joint processing, from the BS;
- a sounding mapper for, when the control message is received, generating a second sounding sequence by mapping estimated phases of downlink channels per subcarrier of BSs involving the multi-BS joint processing, to a first sounding sequence allocated from the BS; and
- a transmitter for transmitting the second sounding sequence, comprising the phases of the downlink channels per subcarrier, over a sounding symbol interval with respect to each of the BSs involving the multi-BS joint processing.

12. The apparatus of claim 11, wherein the sounding mapper is allocated the first sounding sequence, measures the phase of the downlink channel per subcarrier with respect to the estimated BSs involving the multi-BS joint processing, and maps the phases of the downlink channels to the first sounding sequence.

13. The apparatus of claim 11, wherein the transmitter transmits a sounding sequence comprising the phase of the downlink channel per subcarrier of a corresponding BS over a corresponding sounding interval.

14. The apparatus of claim 13, wherein the corresponding sounding interval is a predefined calibration interval based on the sounding sequence between the BS and the MS.

15. The apparatus of claim 11, wherein a whole sounding interval for delivering the second sounding sequence is determined by considering the number of the BSs involving the multi-BS joint processing.

16. The apparatus of claim 11, wherein the multicell MIMO transmission is at least one of a Closed Loop Macro Diversity (CL-MD) and a Collaborative MIMO (Co-MIMO).

17. The apparatus of claim 11, wherein the multiple antenna system comprises Time Division Duplex (TDD) system based on Orthogonal Frequency Division Multiplexing (OFDM)/Orthogonal Frequency Division Multiple Access (OFDMA).

18. An apparatus of a Base Station (BS) for performing calibration for multicell Multiple Input Multiple Output (MIMO) transmission in a multiple antenna system, the apparatus comprising:
- a controller for negotiating a multi-BS joint processing with a Mobile Station (MS);
- a transmitter for transmitting a control message comprising information instructing multi-BS calibration for sounding based on the multi-BS joint processing, to the MS;
- a receiver for, after the control message is sent, receiving a sounding sequence comprising a phase of a downlink channel per subcarrier of the MS over a corresponding sounding symbol interval; and
- a phase shift compensator for compensating for mismatch between the phase of the downlink channel and a phase of an uplink channel from the received sounding sequence.

19. The apparatus of claim 18, wherein the multicell MIMO transmission is at least one of a Closed Loop Macro Diversity (CL-MD) and a Collaborative MIMO (Co-MIMO).

20. The apparatus of claim 18, wherein the multiple antenna system comprises Time Division Duplex (TDD) system based on Orthogonal Frequency Division Multiplexing (OFDM)/Orthogonal Frequency Division Multiple Access (OFDMA).

* * * * *